Patented July 14, 1942

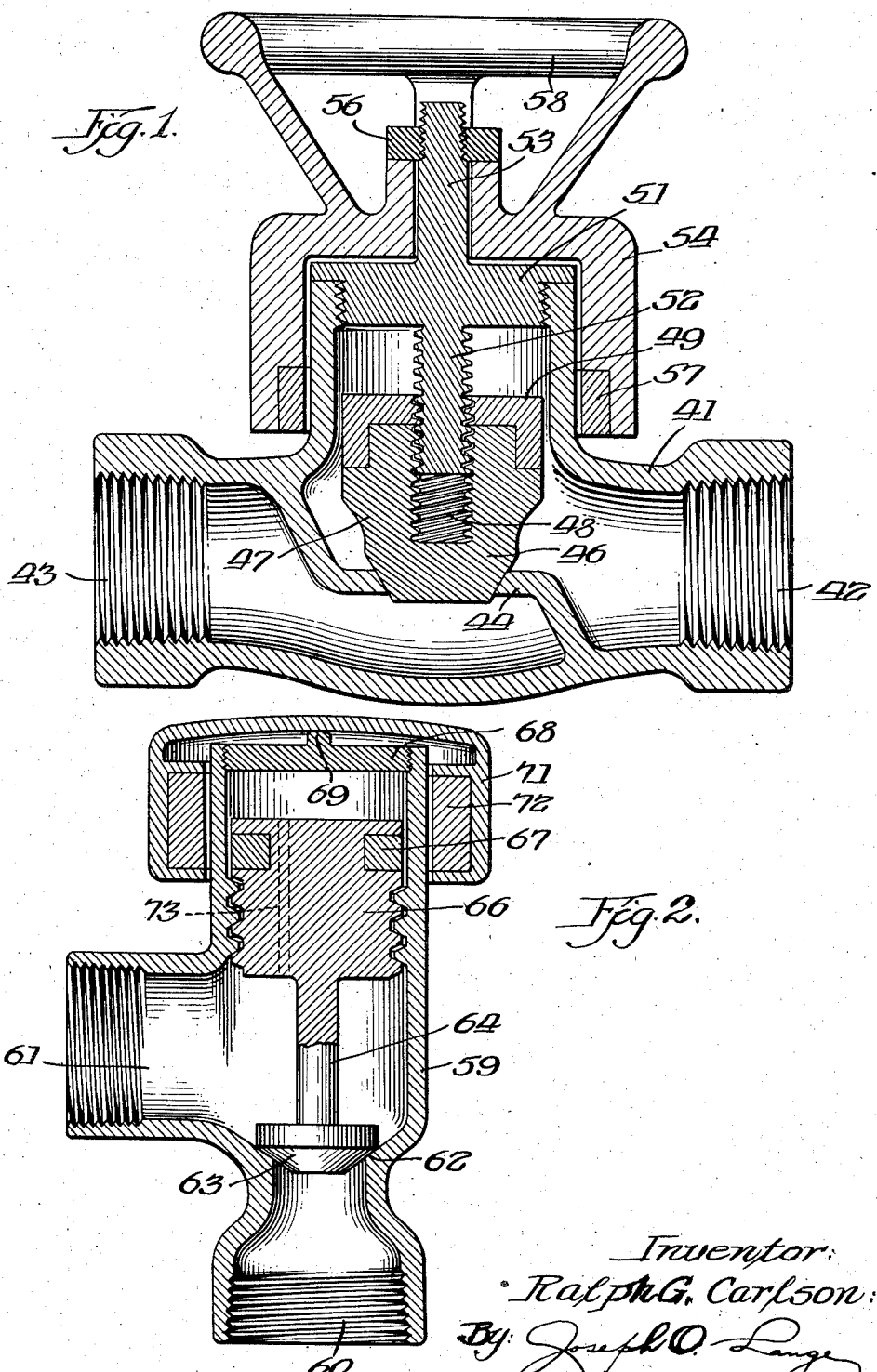

2,289,574

UNITED STATES PATENT OFFICE 2,289,574

VALVE

Ralph G. Carlson, Chicago, Ill., assignor to Crane Co., Chicago, Ill., a corporation of Illinois Application June 19, 1941, Serial No. 398,743

6 Claims. (Cl. 137—139)

This invention relates to a new and improved packless valve, and has for one of its principal objects the provision of a magnetic clutch for threadedly reciprocating the valve closure member by the employment of permanent magnets positioned externally and internally of the valve and a magnetic flux operating therebetween.

Another important object of this invention is to provide a compact valve wherein no packing is required thus overcoming the usual leakage problem or "freezing" of the conventional packing as ordinarily occasioned by the packing sticking to the stem after standing for some period of time.

Another important object of this device is the provision of a magnetic clutch operating means for valves of the type having reciprocating closure members by the use of permanent magnets of such a high coercive force that demagnetization by shock or heat is practically eliminated.

Other and further objects of this invention will become apparent from the disclosures in the accompanying drawing and following specification.

The invention in a preferred form is shown in the drawing and hereinafter more fully described.

In the drawing:

Fig. 1 is a packless valve embodying one form of my invention.

Fig. 2 is a modified form of my invention.

Fig. 1 shows an adaptation of the magnetic clutch of this invention as applied to the regular globe type of valve having a body or casing 41, an inlet 42 and an outlet 43. The seat 44 is provided with a partition between the inlet 42 and the outlet 43. A disc 46 operates reciprocably on the seat 44 for opening or closing of the valve for passage or non-passage of the fluid from the inlet to the outlet. Integrally associated with the disc 46 is the shank or head portion 47 having the centrally tapped hole 48 and the magnet 49 positioned within and around the top of this head or shank 47. The top opening of the valve is provided with a plug 51 having a stud 52 screw threaded for operative engagement with the tapped hole 48 in the head or shank of the disc 46. Another stud or extension 53 is positioned centrally and atop of the plug 51 which has rotatably mounted thereover the cap 54, the latter member being held in position by the locknut 56 screw threaded to the top of the stud 53. Magnets 57 are positioned around the lower extremity of the cap 54 for concentric engagement by magnetic flux with the magnet 49 positioned around the head 47 of the disc 46. Rotation is imparted to the cap 54 by the handwheel 58. The magnets 49 and 57 are concentric to each other and are preferably composed of four poles each that are aligned so that opposite poles of the magnets are acting with each other. Such opposition of unlike poles creates the magnetic field and prevents the turning of one without the turning of the other. In operation, the valve is actuated by rotation of the handwheel 58 which imparts rotary motion to the cap 54 in which the inset magnet 57 further imparts rotary motion to the internally positioned head 47 and the disc 46. Such rotation results in either a raising or lowering of the disc 46 and its integral head on the stud 52. It can therefore be readily seen that the magnetic clutch as arranged can be used in any type of valve and for discs that operate merely by rotation or discs that operate by reciprocable movement either upwardly or downwardly or horizontally.

As shown in Fig. 2 in which a further modified form is illustrated, the valve has a body or casing 59 with the usual inlet 60 and the outlet 61. The seat positioned above the inlet, namely 62, has for cooperative engagement therewith the disc 63. Above the disc 63 is the integral stem 64 having an enlarged head 66 suitably threaded for engagement with internal screw threads on the body of the valve 59. Positioned within and around the head 66 are the permanent magnets 67. The upper end of the valve 59 is closed by means of the plug 68 which has a ball-shaped knob or extension 69. An enclosure form of handwheel 71 has positioned therein the magnets 72. The handwheel 71 is rotatably supported on the knob or ball extension 69. The modified valve operates similarly to the valve shown in Fig. 1 by the concentric positioning of the magnet 72 around the magnet 67. In order to obtain complete overlapping of the concentric magnet, the magnet 72 in the cap 71 is positioned or extended over a major part of the depending portions of the cap 71 so that upon lifting of the head, stem and disc by a rotation of the cap 71, the magnet 67 will always be within the magnetic lines of force of the concentric magnet 72.

In valves wherein magnetic clutches are employed to operate an internal disc without actual engagement therewith, it is necessary to minimize friction and other elements which ordinarily tend to make the disc rotatable or liftable only upon the employment of a considerable amount of torque. As shown in Fig. 2, the head 66 is large enough so that the threads thereon are preferably of the loose fitting type for cooperation with the internal body threads and have a pitch small enough wherein a turning or rotating of the head 66 is accomplished by a very small amount of rotative effort. Elimination of packing also reduces the torque necessary for operating valves. A hole 73 is bored through the head 66 to equal the pressure in the chamber above the head 66 upon lifting of the said head. The normal friction of the handwheels when turning them over the valve casings is reduced to a minimum by the use of the knob or ball connection.

Permanent magnets of the aluminum nickel alloy type have been developed in recent years to such an extent that the coercive force of these magnets prevents demagnetization by heat or shock or the like and permits a permanent magnet to capably operate in the capacity hereinbefore described.

I am aware that numerous details of construction may be varied throughout a wide range without departing from the principles and purposes of my invention, and I therefore do not intend limiting the scope of my patent otherwise than as necessitated by the prior art.

I claim:

1. A packless valve, comprising a valve casing, a threadedly reciprocable closure member, the said closure member having a threaded extension, mating threads in the said valve for engagement with the threads of the said extension, a permanent magnet positioned around the said extension, a cap positioned externally of and over the said valve casing, a permanent magnet within the said cap and concentrically positioned in relation to the first named magnet around the said extension, whereby a magnetic field is created between the said magnets and whereby rotation of the external cap causes like rotation of the internal closure member with reciprocable movement of the latter member.

2. A packless valve comprising a body of a non-magnetic material having an inlet and an outlet, a seat in the said body, a closure for reciprocable movement to and from the said seat, said closure having an upwardly projecting extension, a threaded recess in said extension, a permanent magnet surrounding the upper portion of the said extension, a plug in the upper end of the said body, a stud centrally positioned on each of the upper and lower faces of the said plug, the stud on the lower face of the said plug being threaded for engagement with the threaded recess of the said extension, a cap-shaped member having a central opening therethrough for reception of the said stud on the upper face of the plug, a locknut on the said upper stud for maintaining the cap member in fixed rotatable position within the said body, a permanent magnet positioned within the said cap member, the said magnet in the cap member being concentric with the magnet on the extension whereby when the cap is rotated the concentric magnets act as a chuck and the closure and the said extension are rotated on the screw threaded stud on the lower face of the plug.

3. A packless valve comprising a casing having a passageway therethrough, a threadedly reciprocable closure member for said passageway, a permanent magnet positioned around the said closure member, a cap positioned externally of and over the said valve casing, a permanent magnet within the said cap and concentrically positioned in relation to the first named magnet around the said closure member, whereby a magnetic field is created between the said magnets and whereby rotation of the external cap causes like rotation of the internal closure member to effect reciprocable movement of the latter member.

4. A packless valve comprising a casing having a passageway therethrough, a closure member for said passageway, internal threads in the walls of said casing, external threads on the said closure member, whereby the said closure member is threadedly reciprocable in the said casing with respect to the said passageway, a permanent magnet positioned around the said closure member, a cap positioned externally of and over the said valve casing, a permanent magnet within the said cap and concentrically positioned in relation to the first named magnet around the said closure member, whereby a magnetic field is created between the said magnets and whereby rotation of the external cap causes like rotation of the internal closure member to effect reciprocal movement of the latter member.

5. A packless valve comprising a body of non-magnetic material having an inlet and an outlet, a seat in the said body, a closure suitable for reciprocable movement to and from the said seat, a stem having threads at its upper end portion, a permanent magnet surrounding the upper end of the said stem, the said body having threaded means for operative engagement with the said stem, an inverted cup-shaped member surmounting the said body, a permanent magnet fixedly positioned within a substantial portion of the cup-shaped member whereby the magnet in the said cup-shaped member coacts with the magnet on the stem and movement of the latter member is effected by the magnetic fields therebetween upon rotative movement of the said cup-shaped member.

6. A packless valve comprising a body of non-magnetic material having an inlet and an outlet, a seat in the said body, a closure reciprocably movable to and from the said seat, a threaded stem enlarged at its upper end journaled within the said body, a permanent magnet surrounding a portion of the said stem, a cap for the valve, a permanent magnet within the said cap concentric with the said first named magnet, a plug in the upper portion of said valve, a centrally positioned raised portion on the said plug serving as a supporting guide for the said cap upon rotation of the latter member.

RALPH G. CARLSON.